(12) United States Patent
Yang et al.

(10) Patent No.: US 9,210,158 B2
(45) Date of Patent: Dec. 8, 2015

(54) METHOD AND SYSTEM FOR OBTAINING APPLICATION INFORMATION OF MULTIPLE WEBSITES

(71) Applicant: Tencent Technology (Shenzhen) Company Ltd., Shenzhen (CN)

(72) Inventors: Yu Yang, Shenzhen (CN); Tingting An, Shenzhen (CN); Yiping Chen, Shenzhen (CN); Rongjun Feng, Shenzhen (CN); Zhiyong Lai, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 67 days.

(21) Appl. No.: 14/153,264

(22) Filed: Jan. 13, 2014

(65) Prior Publication Data
US 2014/0130144 A1 May 8, 2014

Related U.S. Application Data

(63) Continuation of application No. PCT/CN2012/077717, filed on Jun. 28, 2012.

(30) Foreign Application Priority Data

Jul. 12, 2011 (CN) .......................... 2011 1 0194122

(51) Int. Cl.
*H04L 29/06* (2006.01)
*H04L 29/08* (2006.01)
*G06F 17/30* (2006.01)

(52) U.S. Cl.
CPC ............ *H04L 63/0815* (2013.01); *G06F 17/30* (2013.01); *H04L 67/02* (2013.01); *H04L 67/2838* (2013.01); *H04L 67/20* (2013.01)

(58) Field of Classification Search
CPC . H04L 67/20; H04L 67/2838; H04L 63/0815; H04L 67/02; G06F 17/30
See application file for complete search history.

(56) References Cited

U.S. PATENT DOCUMENTS 6,826,696 B1* 11/2004 Chawla et al. ..................... 726/4
2005/0154913 A1* 7/2005 Barriga ................... G06F 21/33
726/4

(Continued)

FOREIGN PATENT DOCUMENTS

CN 1946022 A 4/2007
CN 101557403 A 10/2009

(Continued)

OTHER PUBLICATIONS

Ng et al., Security Challenges in Designing an Integrated Web Application for Multiple Online Banking, Jun. 2010, 2010 International Symposium in Information Technology, vol. 1, pp. 1-5.*

(Continued)

*Primary Examiner* — Kenneth Chang
(74) *Attorney, Agent, or Firm* — Marshall, Gerstein & Borun LLP

(57) ABSTRACT

The present disclosure describes a method and an apparatus for obtaining application information of multiple websites. A corresponding relationship between a main account and multiple pieces of association information is saved in advance. Each piece of association information comprises application authorization information and authentication information of a third-party website. A login request carrying the main account transmitted by a user is received and authenticated. After the user logs in, the multiple pieces of association information is obtained from the corresponding relationship according to the main account carried in the login request. An application information obtaining request is transmitted to multiple third-party websites corresponding to the multiple pieces of association information. A requested result of the application information obtaining request is returned to the user.

9 Claims, 4 Drawing Sheets

(56) References Cited

U.S. PATENT DOCUMENTS

| | | |
|---|---|---|
| 2006/0218630 A1* | 9/2006 | Pearson et al. .................... 726/8 |
| 2009/0126000 A1* | 5/2009 | Andreev et al. ................... 726/8 |
| 2009/0222899 A1 | 9/2009 | Walters |
| 2009/0292927 A1* | 11/2009 | Wenzel .............. H04L 63/0815 713/185 |
| 2009/0328169 A1* | 12/2009 | Hutchison .............. G06F 21/41 726/7 |
| 2010/0017616 A1* | 1/2010 | Nichols et al. ................ 713/183 |
| 2012/0047517 A1* | 2/2012 | Townsend et al. ........... 719/313 |

FOREIGN PATENT DOCUMENTS

| | | |
|---|---|---|
| CN | 101697537 A | 4/2010 |
| CN | 101872365 A | 10/2010 |

OTHER PUBLICATIONS

International Search Report for PCT/CN2012/077717 dated Oct. 12, 2004.

International Preliminary Report on Patentability from PCT/CN2012/077717 dated Jan. 14, 2014.

* cited by examiner

METHOD AND SYSTEM FOR OBTAINING APPLICATION INFORMATION OF MULTIPLE WEBSITES

CROSS-REFERENCE TO RELATED APPLICATIONS

This application is a continuation of International Application No. PCT/CN2012/077717, filed on Jun. 28, 2012. This application claims the benefit and priority of Chinese Patent Application No. 201110194122.5, filed Jul. 12, 2011. The entire disclosures of each of the above applications are incorporated herein by reference.

FIELD

The present disclosure relates to Internet techniques, and more particularly, to a method and a system for obtaining application information of multiple websites.

BACKGROUND

Currently, there are many Internet websites. After inputting account information and logging in a website, a user may use various kinds of application information such as friend status, log, microblog and photos of the website.

During the login procedure, a session key may be generated for the user after the user inputs correct account information (such as a user name and a password) and a login authentication succeeds. Thereafter, the user may obtain various kinds of application information of the website taking the session key as an identifier.

SUMMARY

Examples of the present disclosure provide a method and an apparatus for obtaining application information of multiple websites. Thus, a user only needs to perform a login operation for one time to obtain the application information of multiple websites.

According to an example of the present disclosure, a method for obtaining application information of multiple websites is provided. A corresponding relationship between a main account and multiple pieces of association information is saved in advance, and each piece of association information includes application authorization information and authentication information of a third-party website. The method includes:
  receiving and authenticating a login request carrying the main account transmitted by a user;
  after the user logs in, obtaining the multiple pieces of association information from the corresponding relationship according to the main account carried in the login request, and transmitting an application information obtaining request to multiple third-party websites corresponding to the multiple pieces of association information; and
  returning a requested result of the application information obtaining request to the user.

According to another example of the present disclosure, an apparatus for obtaining application information of multiple websites is provided. The system includes:
  a storage module, to
  save a corresponding relationship between a main account and multiple pieces of association information, wherein each piece of association information comprises application authorization information and authentication information of a third-party website;
  an access module, to
  receive and authenticate a login request carrying the main account transmitted by a user,
  transmit, after the user logs in, the multiple pieces of association information associated with the main account saved in the storage module to a proxy module; and
  return a requested result of an application information obtaining request received from the proxy module to the user;
  the proxy module, to
  transmit the application information obtaining request to multiple third-party websites according to the multiple pieces of association information associated with the main account transmitted by the access module; and
  return the requested result of the application information obtaining request to the access module.

In view of the above, according to the method and system provided by examples of the present disclosure, account information of multiple websites may be associated with one main account. Thus, after the user logs in using the main account, application information of multiple websites may be automatically retrieved according to the information used for retrieving the application information saved in advance. Therefore, the user only needs to perform the login operation for one time to obtain the application information of multiple websites.

DETAILED DESCRIPTION

The present disclosure will be described in further detail with reference to accompany drawings and examples to make the technical solution and merits therein clearer.

Figure 1:
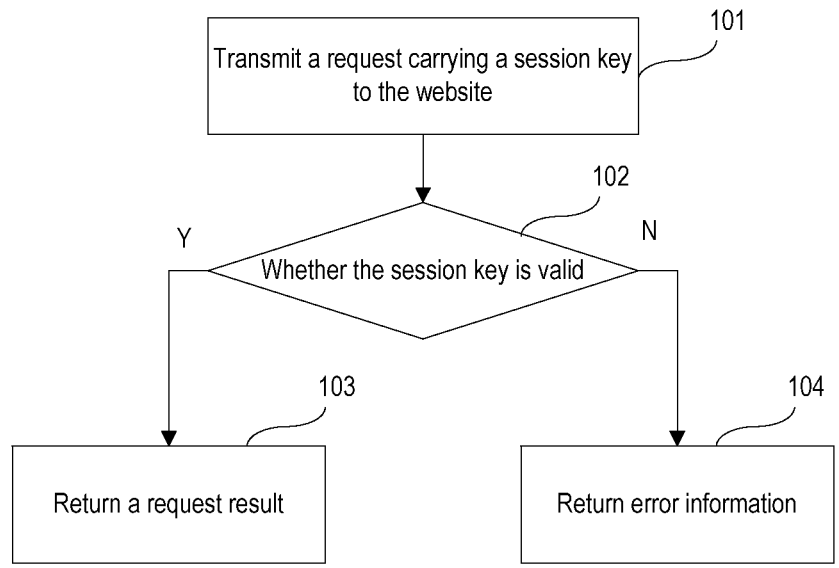
FIG. 1 is a flowchart illustrating a conventional method for obtaining application information of a single website.

A conventional method for obtaining application information of a website is as shown in FIG. 1, which includes the following.

At block 101, a user client (such as a browser) transmits a request (e.g., click a button of the website) carrying a session key to the website.

At block 102, the website authenticates the session key to determine whether the session key is valid. If valid, block 103 is performed; otherwise, block 104 is performed.

At block 103, a request result (e.g., a webpage containing application information) is returned.

At block 104, error information is returned.

The above application information obtaining procedure is merely applicable for logging in a website and visiting applications in this website and friends in an account system of this website. Generally, the user uses services provided by multiple websites. However, account systems of different websites are independent with each other. If the user wants to obtain application information of multiple websites, he has to log in these websites manually and repeat the login authentication operations of these websites. Then the user obtains the required application information of the multiple websites through switching and visiting webpages of different websites.

Currently, there are more and more kinds of Internet websites. Thus, the user may have a strong requirement to use applications of different websites and obtain various kinds of information. However, according to the conventional independent website login method, the user has to open multiple websites and input different account information for authentication to obtain the application information of multiple websites. The operation is complex and the user's experience is poor. It is also very inconvenient to use. In addition, it is hard for the user to remember the account information of so many websites.

In an example of the present disclosure, account information of multiple websites is associated with one main account. After the user logs in using the main account, the system provided by examples of the present disclosure transmits an application information obtaining request to the multiple third-party websites according to application authorization information and authentication information of the multiple third-party websites which are associated with the main account and saved in the system in advance. Thus, the application information of the multiple websites can be automatically retrieved for the user and then returned to the user. The user only needs to perform the login operation for one time to obtain the application information of the multiple websites.

Figure 2:
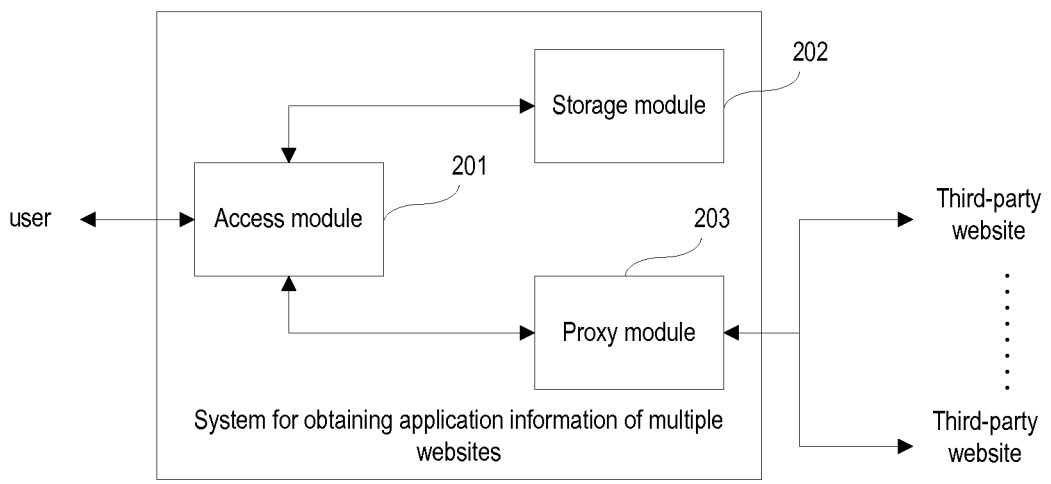
FIG. 2 is a schematic diagram illustrating a structure of a system for obtaining application information of multiple websites according to an example of the present disclosure.

FIG. 2 is a schematic diagram illustrating a system for obtaining application information of multiple websites according to an example of the present disclosure. As shown in FIG. 2, the system includes: an access module 201, a storage module 202 and a proxy module 203.

The access module 201 is to receive and authenticate a login request which is transmitted by a user and carries a main account;

transmit, after the user logs in, application authorization information and authentication information of multiple third-party websites which are associated with the main account and pre-saved in the storage module 202 to the proxy module 203; and receive a requested result, i.e., the application information, received from the proxy module 203 to the user.

In particular, the access module 201 may provide a webpage for the user. The user visits the webpage and transmits the login request to the access module 201 via a browser. The access module 201 authenticates the account information carried in the login request. After the authentication succeeds, i.e., after the user successfully logs in, the following operation of transmitting the application authorization information and the authentication information of multiple third-party websites which are associated with the main account and pre-saved in the storage module 202 to the proxy module 203 is performed. In addition, in order to ensure that a client such as a browser used by the user can respond to the application information returned to the user in real-time, the access module 201 may push the application information of the multiple third-party websites obtained by the proxy module 203 to the user in an asynchronous and real-time manner by way of long polling or comet, so as to display the application information to the user in the same webpage in real-time.

The storage module 202 is to save a corresponding relationship between the main account and multiple pieces of association information, wherein each piece of association information includes the application authorization information and the authentication information of the third-party website.

A detailed storage format may be as shown in the following table 1.

TABLE 1 a storage table of the application authorization information and the authentication information of multiple third-party websites associated with the main account

| User ID | Application authorization information 1 of a first third-party website | Authentication information 1 |
|---|---|---|
| User ID | Application authorization information 2 of a second third-party website | Authentication information 2 |
| User ID | Application authorization information 3 of a third third-party website | Authentication information 3 |

In table 1, the application authorization information of the third-party website includes information such as a website address, an authorized domain of the application. The authentication information is used by the proxy module 203 to accept an authentication of the third-party website when retrieving the application information corresponding to the third-party website according to the application authorization information. The authentication information may be a private key or a public key. It is determined by an authentication manner of the third-party website. The user ID is a legal user account used by the user to complete the login authentication. One user ID may correspond to the application information and the authentication information of multiple third-party websites. For different user accounts used by the user, application authorization information and authentication information of different third-party websites may be saved.

The proxy module 203 is to transmit an application information obtaining request to the multiple third-party websites according to the application authorization information and the authentication information of the multiple third-party websites associated with the main account transmitted by the access module 201; and return the requested result to the access module 201.

In the example of the present disclosure, instead of retrieving information from front ends of the websites, the proxy module 203 is utilized to obtain the application information. Thus, if the user uses multiple third-party websites at the same time, it is possible to use only one application information obtaining request to receive multiple requested results returned through the access module 201, which avoids a slow response due to multiple application information obtaining requests of the user.

Figure 5:
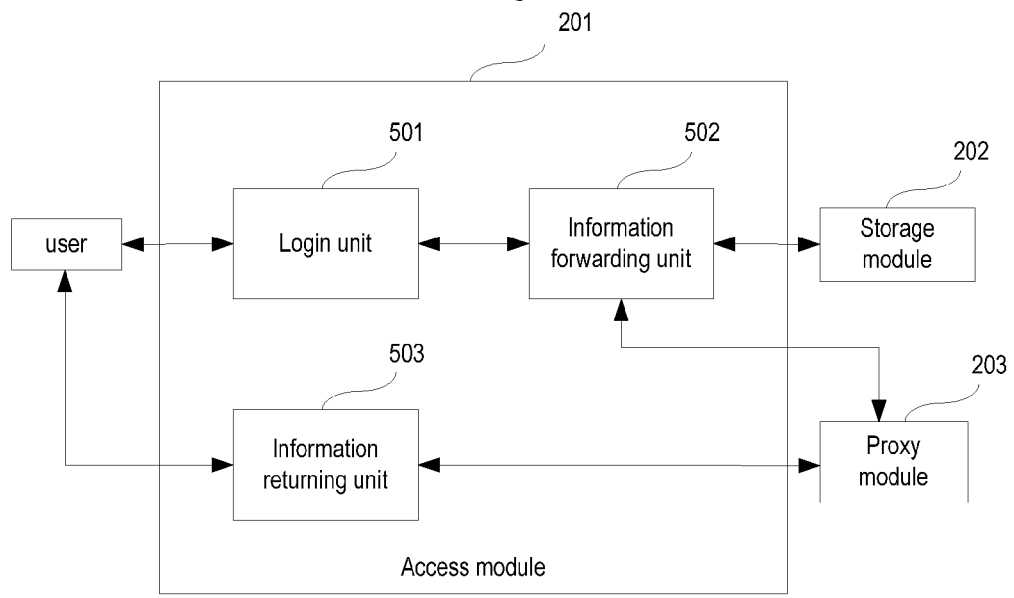
FIG. 5 is a schematic diagram illustrating a structure of an access module according to an example of the present disclosure.

A detailed structure of the access module 201 may be as shown in FIG. 5, including:

a login unit 501, to receive and authenticate a login request transmitted by the user;

an information forwarding unit 502, to transmit, after the user logs in, application authorization information and authentication information of multiple third-party websites which are associated with the main account and saved in the storage module 202 to the proxy module 203; and an information returning unit 503, to return a requested result of the application information obtaining request obtained by the proxy module 203 to the user.

Figure 6:
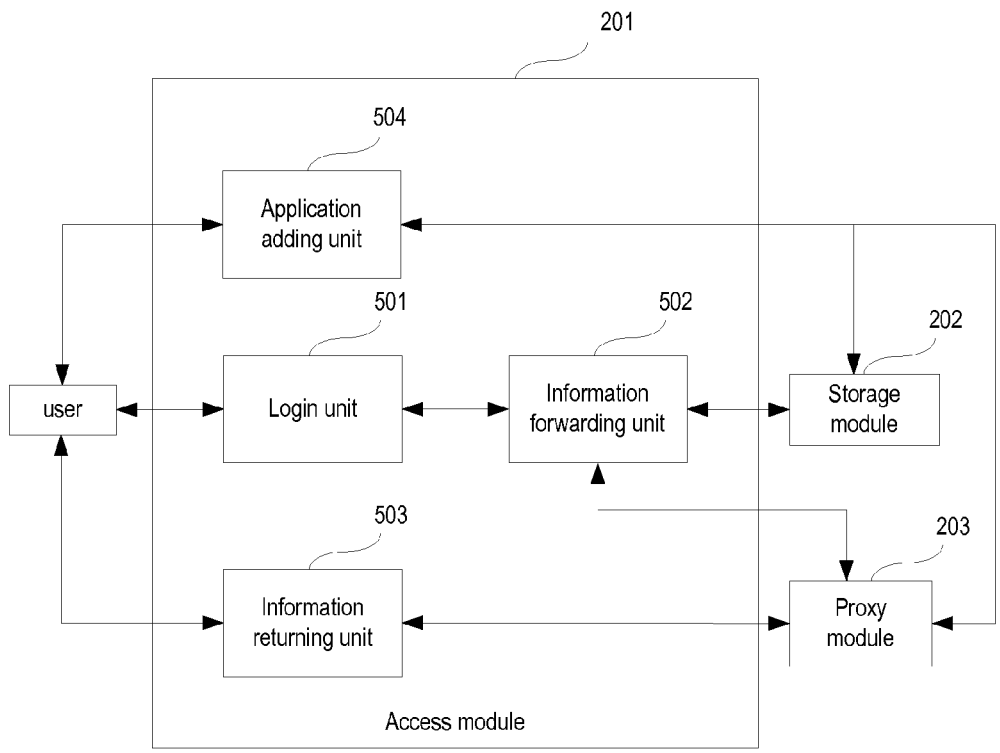
FIG. 6 is a schematic diagram illustrating another structure of the access module according to an example of the present disclosure.

In addition, in a practical application scenario, the application authorization information and authentication information of multiple third-party websites which are associated with the main account and saved in the storage module 202 should be obtained in advance. In particular, the information may be written in the storage module 202 through visiting the storage module 202 directly, or may be implemented by the access module 201 through transmitting an application adding request to the access module 201 by the user. In order to implement the adding of an application, the access module 201 may further include an application adding unit 504, as shown in FIG. 6.

The application adding unit 504 is to receive an application adding request carrying the main account of the user; wherein the application adding request further includes the authentication information of the third-party website returned by the third-party website in response to an application authorization request transmitted by the user to the third-party website according to the account information of the third-party website, and includes the application authorization information corresponding to the application authorization request; and instruct the proxy module 203 to transmit the application information obtaining request to the third-party website according to the application authorization information and the authentication information carried in the application adding request, if the application information obtaining request is valid, save the application authorization information and the authentication information of the third-party website into the storage module 202 in association with the main account.

Figure 3:
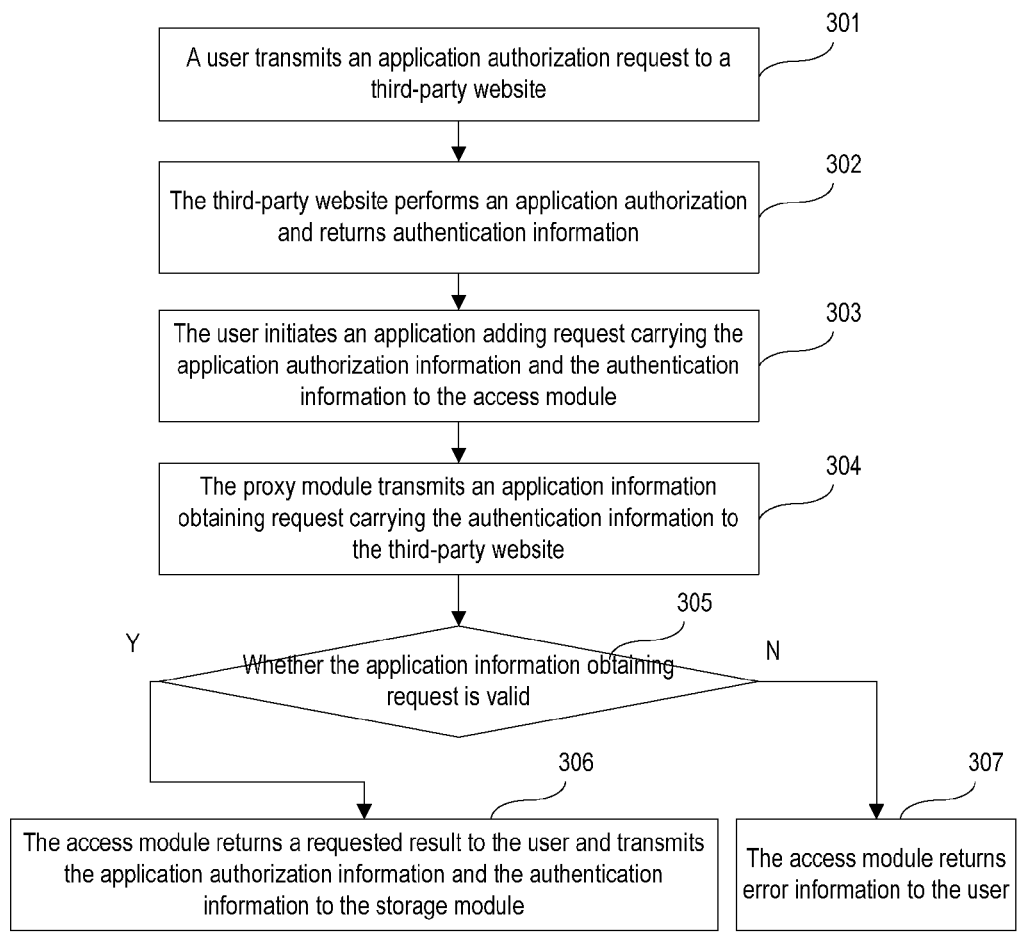
FIG. 3 is a flowchart illustrating a method for adding an application of a third-party website in the system for obtaining application information of multiple websites according to an example of the present disclosure.

FIG. 3 is a flowchart illustrating a method for obtaining application information of multiple third-party websites according to an example of the present disclosure. As shown in FIG. 3, the method includes the following.

At block 301, a user transmits an application authorization request to a third-party website.

The user requests to add an application via a webpage provided by the access module 201. At this time, the webpage may jumps to the third-party website. The user inputs account information of the third-party website to initiate the application authorization request.

At block 302, the third-party performs an application authorization and returns authentication information.

The third-party website authenticates the account information of the user. If the account information is valid, the application requested by the user is authorized. A bunch of authentication keys, i.e., authentication information is generated for the user based on the authorized application and returned to the user. After being authorized, the user is able to retrieve application information using the authentication keys without a login operation. When retrieving the application information, the user does not need to transmit the account information of the third-party website to the third-party website. Therefore, the account information of the third-party website will not be leaked.

At block 303, the access module 201 receives an application adding request transmitted by the user.

The application adding request carries a main account, and further carries the application authorization information and the authentication information. The application adding request may be initiated by the user to the access module 201 via the webpage provided by the access module 201.

At block 304, the proxy module 203 transmits an application information obtaining request to the third-party website.

At block 305, it is determined whether the application information obtaining request is valid. If valid, block 306 is performed; otherwise, block 307 is performed.

At block 306, the application authorization information and the authentication information are saved.

When the application authorization information and the authentication information are saved, the obtained application information may be returned to the user.

At block 307, error information is returned.

The error information may be returned to the user via the webpage.

Figure 7:
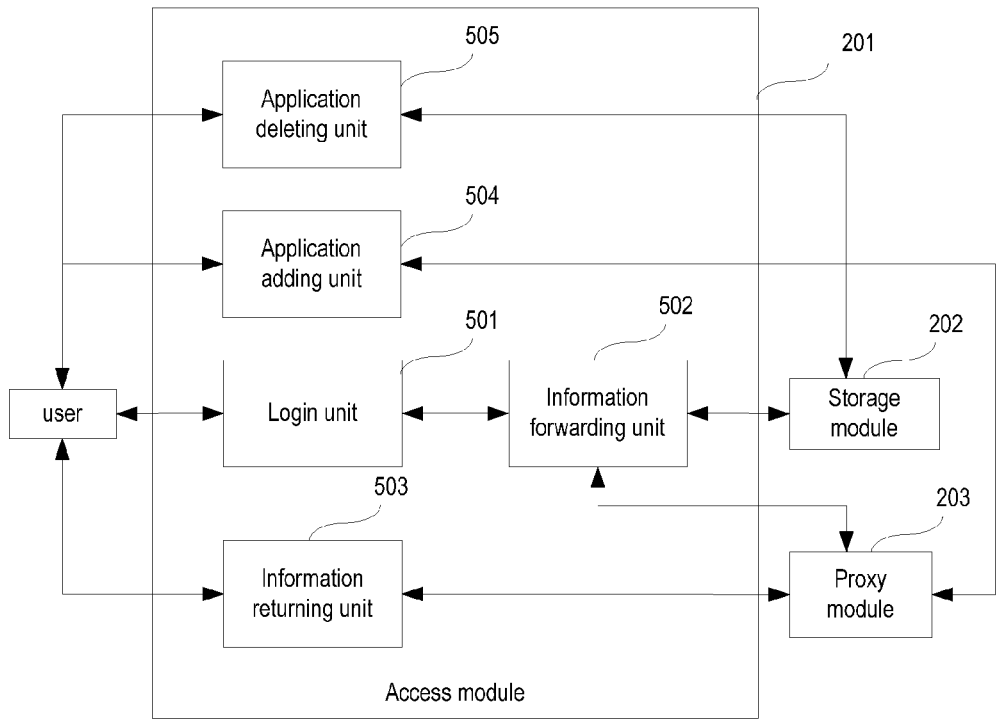
FIG. 7 is a schematic diagram illustrating still another structure of the access module according to an example of the present disclosure.

In addition, the user may also delete the saved application authorization information and the authentication information of multiple third-party websites associated with the main account. The deletion may be performed through visiting the storage module 202 and deleting the information from the storage module 202. The deletion may also be initiated by the user through transmitting an application delete request to the access module 201. At this time, the deletion is performed by the access module 201. In order to implement the deletion of the application, the access module 201 may further include an application deleting unit 505, as shown in FIG. 7.

The application deleting unit 505 is to receive an application deleting request carrying a main account of the user, search the storage module 202 according to the main account carried in the application deleting request for corresponding association information; and delete, among the association information searched out, the application authorization information and the authentication information of the third-party website corresponding to the application authorization information carried in the application deleting request.

Figure 4:
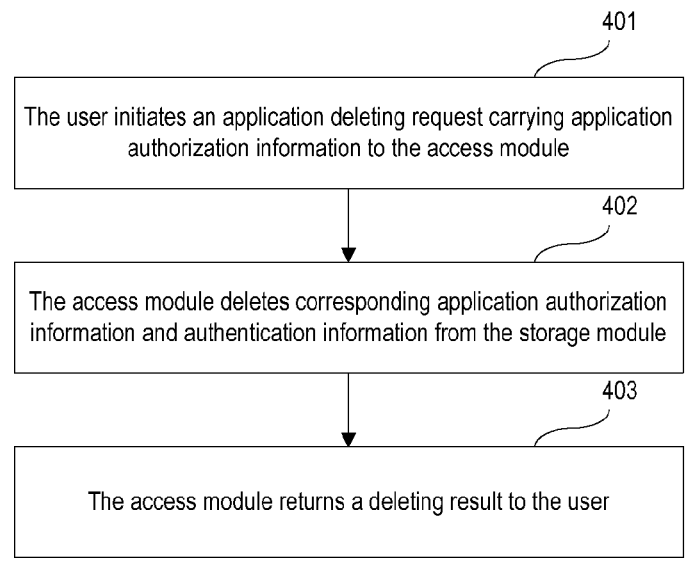
FIG. 4 is a flowchart illustrating a method for deleting an application of a third-party website from the system for obtaining application information of multiple websites according to an example of the present disclosure.

FIG. 4 is a flowchart illustrating a method for deleting an application of a third-party website according to an example of the present disclosure. As shown in FIG. 4, the method includes the following.

At block 401, an application deleting request of the user is received. The application deleting request carries application authorization information to be deleted by the user.

The application deleting request further carries a main account.

At block 402, application authorization information and authentication information of a third-party website which are associated with the main account and corresponding to the application authorization information in the application deleting request are deleted from the storage module 202.

At block 403, a deleting result is returned to the user. For example, if the deletion succeeds, information such as "application authorization information is deleted" may be returned to the user. If the deletion fails, information such as "deletion failed" may be returned to the user.

In view of the above, through the method and system for obtaining application information of multiple websites provided by the examples of the present disclosure, the user is able to automatically log in multiple third-party websites to obtain the application information through logging in a single website using the main account (e.g., via the webpage provided by the access module 201), which reduces operation costs for switching between multiple websites back and forth. In order to ensure that applications of multiple websites can be obtained through one login, the authentication information of the third-party websites is saved in examples of the present disclosure. Through a background issuing manner, the user is able to receive messages pushed by applications of the third-party websites after logging in. The bothersome operation of inputting login information for multiple times may be avoided.

The modules or units in the examples of the present disclosure may be implemented by software (e.g. machine readable instructions stored in a non-transitory memory and executable by one or more processors), hardware, or a combination thereof.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for obtaining application information of multiple websites, wherein a corresponding relationship between a main account and multiple pieces of association information is saved in advance, and each piece of association information comprises application authorization information and authentication information of a third-party website, the method comprises:
receiving and authenticating a login request carrying the main account transmitted by a user;
in response to determining that the user logs in using the main account, obtaining the multiple pieces of association information from the corresponding relationship according to the main account carried in the login request, and transmitting an application information obtaining request containing the multiple pieces of association information to multiple third-party websites corresponding to the multiple pieces of association information to log in the multiple third-party websites;
generating authentication keys for the user based on the log in to the multiple third-party websites, wherein the user retrieves the application information of multiple websites using the authentication keys without further login operations; and
returning application information obtained from the multiple third-party websites to the user by pushing the application information obtained from the multiple third-party websites to the user for display in an asynchronous and real-time manner by long polling or comet.

2. The method of claim 1, wherein the saving of the corresponding relationship between the main account and the multiple pieces of association information in advance comprises:
receiving an application adding request carrying the main account transmitted by the user; wherein the application adding request further comprises: the authentication information returned by the third-party website in response to an application authorization request transmitted by the user to the third-party website according to account information of the third-party website, and comprises the application authorization information corresponding to the application authorization request; and
transmitting the application information obtaining request to the third-party website according to the application authorization information and the authentication information carried in the application adding request; if the application information obtaining request is valid, saving the application authorization information and the authentication information of the third-party website as the association information associated with the main account.

3. The method of claim 2, further comprising:
receiving an application deleting request of the user, wherein the application deleting request comprises the main account and the application authorization information;
searching the corresponding relationship according to the main account carried in the application deleting request for the association information corresponding to the main account; and
deleting the application authorization information and the authentication information of the third-party website corresponding to the application authorization information carried in the application deleting request from the association information searched out.

4. The method of claim 2, wherein the application authorization information comprises:
a website address or an authorized domain of the third-party website corresponding to the application authorization request.

5. A system for obtaining application information of multiple websites, comprising:
one or more processors;
memory; and
one or more program modules stored in the memory and to be executed by the one or more processors, the one or more program modules including
a storage module, to
save a corresponding relationship between a main account and multiple pieces of association information, wherein each piece of association information comprises application authorization information and authentication information of a third-party website;
an access module, to
receive and authenticate a login request carrying the main account transmitted by a user,
transmit, in response to determining that the user logs in using the main account, the multiple pieces of association information associated with the main account saved in the storage module to a proxy module; and
return application information received from the proxy module to the user; the
proxy module, to
transmit an application information obtaining request containing the multiple pieces of association information to multiple third-party websites according to the multiple pieces of association information associated with the main account transmitted by the access module to log in the multiple third-party websites;
generate authentication keys for the user based on the log in to the multiple third-party websites, wherein the user retrieves the application information of multiple websites using the authentication keys without further login operations; and
return application information obtained from the multiple third-party websites to the access module;
wherein the access module pushes the application information obtained by the proxy module from the multiple third-party websites to the user for display in an asynchronous and real-time manner by long polling or comet.

6. The system of claim 5, wherein the access module comprises:
   a login unit, to receive and authenticate the login request transmitted by the user;
   an information forwarding unit, to transmit, in response to determining that the user logs in using the main account, the multiple pieces of association information associated with the main account saved in the storage module to the proxy module; and
   an information returning unit, to return the application information obtained by the proxy module to the user.

7. The system of claim 6, wherein the access module further comprises:
   an application adding unit, to
   receive an application adding request carrying the main account of the user; wherein the application adding request further comprises the authentication information of the third-party website returned by the third-party website in response to an application authorization request transmitted by the user to the third-party website according to account information of the third-party website, and comprises the application authorization information corresponding to the application authorization request; and
   instruct the proxy module to transmit the application information obtaining request to the third-party website according to the application authorization information and the authentication information carried in the application adding request, if the application information obtaining request is valid, save the application authorization information and the authentication information of the third-party website into the storage module in association with the main account.

8. The system of claim 6, wherein the access module further comprises:
   an application deleting unit, to
   receive an application deleting request carrying the main account of the user, wherein the application deleting request further comprises the application authorization information;
   search the storage module according to the main account carried in the application deleting request for corresponding association information; and
   delete, among the association information searched out, the application authorization information and the authentication information of the third-party website corresponding to the application authorization information carried in the application deleting request.

9. The system of claim 7, wherein the access module further comprises:
   an application deleting unit, to
   receive an application deleting request carrying the main account of the user, wherein the application deleting request further comprises the application authorization information;
   search the storage module according to the main account carried in the application deleting request for corresponding association information; and
   delete, among the association information searched out, the application authorization information and the authentication information of the third-party website corresponding to the application authorization information carried in the application deleting request.

* * * * *